(12) United States Patent
Manj et al.

(10) Patent No.: US 12,429,833 B1
(45) Date of Patent: Sep. 30, 2025

(54) METHOD AND SYSTEM OF RUNNING AN APPLICATION

(71) Applicant: Apple Inc., Cupertino, CA (US)

(72) Inventors: Nurinder Manj, San Jose, CA (US); Christopher L. Oklota, San Francisco, CA (US); Ronald D. Lue-Sang, Union City, CA (US); Vijay Sundaram, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 17/894,993

(22) Filed: Aug. 24, 2022

Related U.S. Application Data

(60) Division of application No. 16/839,001, filed on Apr. 2, 2020, now Pat. No. 11,467,816, which is a
(Continued)

(51) Int. Cl.
G06F 9/445 (2018.01)
G05B 13/04 (2006.01)
(Continued)

(52) U.S. Cl.
CPC ....... *G05B 13/048* (2013.01); *G06F 3/04817* (2013.01); *G06F 8/61* (2013.01); *G06F 8/656* (2018.02); *G06F 3/0481* (2013.01); *G06F 3/0482* (2013.01); *G06F 3/0488* (2013.01); *G06F 8/60* (2013.01); *G06F 8/62* (2013.01); *G06F 8/65* (2013.01); *G06F 8/658* (2018.02);
(Continued)

(58) Field of Classification Search
CPC ......... G05B 13/048; G06F 8/656; G06F 8/61; G06F 8/658; G06F 8/60; G06F 8/62; G06F 8/65; G06F 8/71; G06F 9/445; G06F 9/451; G06F 3/04817; G06F 3/0482; G06F 3/0488
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |

(Continued)

FOREIGN PATENT DOCUMENTS

| | | |
|---|---|---|
| EP | 2430833 | 3/2012 |
| JP | 2000-163031 | 5/2000 |
| JP | 2002-342033 | 11/2002 |

OTHER PUBLICATIONS

Christian Westermark, Mobile Multiplayer Gaming, Jun. 24, 2007, [Retrieved on Jun. 2, 2025]. Retrieved from the internet: <URL: https://www.diva-portal.org/smash/get/diva2:511753/FULLTEXT01.pdf> 109 Pages (1-109) (Year: 2007).*

(Continued)

*Primary Examiner* — Anibal Rivera
(74) *Attorney, Agent, or Firm* — BAKERHOSTETLER

(57) ABSTRACT

A method for transmitting an application is disclosed. The method includes, for example, receiving, from a client, an input for initiating the application; generating an application bundle associated with the application, the application bundle including an address of a server, the address capable of enabling a program on the client to request, from the server, information needed for running the application; and transmitting the application bundle to the client.

20 Claims, 7 Drawing Sheets

Related U.S. Application Data continuation of application No. 14/700,076, filed on Apr. 29, 2015, now abandoned.

(60) Provisional application No. 62/057,633, filed on Sep. 30, 2014.

(51) Int. Cl.

| | | |
|---|---|---|
| *G06F 3/01* | (2006.01) | |
| *G06F 3/04817* | (2022.01) | |
| *G06F 8/61* | (2018.01) | |
| *G06F 8/656* | (2018.01) | |
| *G06F 3/0481* | (2022.01) | |
| *G06F 3/0482* | (2013.01) | |
| *G06F 3/0488* | (2022.01) | |
| *G06F 8/60* | (2018.01) | |
| *G06F 8/65* | (2018.01) | |
| *G06F 8/658* | (2018.01) | |
| *G06F 8/71* | (2018.01) | |
| *G06F 9/451* | (2018.01) | |

(52) U.S. Cl.
CPC ............... *G06F 8/71* (2013.01); *G06F 9/445* (2013.01); *G06F 9/451* (2018.02)

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,214,429 B2 | 7/2012 | Chidel et al. | |
| 8,418,236 B1 | 4/2013 | Havemose | |
| 8,479,122 B2 | 7/2013 | Hotelling et al. | |
| 8,526,782 B2 | 9/2013 | Kaiser et al. | |
| 8,775,501 B2 | 7/2014 | Chidel et al. | |
| 8,806,655 B1 | 8/2014 | Brownell | |
| 8,978,075 B1 | 3/2015 | Kaiser et al. | |
| 9,031,382 B1 | 5/2015 | Kaiser et al. | |
| 9,336,209 B1* | 5/2016 | Gupta | G06Q 10/101 |
| 2004/0237083 A1 | 11/2004 | Alcazar | |
| 2006/0197753 A1 | 9/2006 | Hotelling et al. | |
| 2009/0319737 A1* | 12/2009 | Mani | G06F 9/44573 |
| | | | 711/E12.001 |
| 2010/0293190 A1 | 11/2010 | Kaiser et al. | |
| 2011/0047540 A1* | 2/2011 | Williams | G06F 8/61 |
| | | | 715/740 |
| 2012/0084393 A1* | 4/2012 | Williams | G06F 8/61 |
| | | | 709/224 |
| 2012/0117534 A1 | 5/2012 | Hershenson | |
| 2013/0047149 A1 | 2/2013 | Xu | |
| 2013/0232485 A1 | 9/2013 | Murray | |
| 2014/0094312 A1 | 4/2014 | Wouhaybi | |
| 2014/0096025 A1 | 4/2014 | Mandel | |
| 2014/0165212 A1* | 6/2014 | Kasterstein | G06F 21/31 |
| | | | 726/28 |
| 2014/0244803 A1 | 8/2014 | Kang | |
| 2014/0344804 A1 | 11/2014 | Ein-Gal | |
| 2014/0359408 A1 | 12/2014 | Rosenberg | |
| 2016/0085385 A1 | 3/2016 | Gao | |

OTHER PUBLICATIONS

Eicher et al., "Desktop Integration Management for Portable, Zero-Install and Virtualized Applications," 2011, retrieved from http://citeseerx.ist.psu.edu/viewdoc/download?doi=10.1.1.1056.7746&rep=rep1&type=pdf.

Lee et al., "A Multi-Touch Three Dimensional Touch-Sensitive Tablet," Proceedings of CHI: AMC Conference on Human Factors in Computing Systems, Apr. 1985, pp. 21-25.

Rubine, "Combining Gestures and Direct Manipulation," CHI '92, May 1992, pp. 659-660.

Rubine, "The Automatic Recognition of Gestures," CMU-CS-91-202, Submitted in Partial Fulfillment of the Requirements for the Degree of Doctor of Philosophy in Computer Science at Carnegie Mellon University, Dec. 1991, 285 pages.

Somani, et al., "Application Performance Isolation in Virtualization," 2009 IEEE retrieved from https://ieeexplore/ieee.org/stamp/stamp.jsp?tp=&arnumber=5284105.

U.S. Appl. No. 61/924,200, filed Jan. 6, 2014 by Kaiser et al.

Westerman, "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, Spring 1999, 364 pages.

\* cited by examiner

METHOD AND SYSTEM OF RUNNING AN APPLICATION

CROSS REFERENCE TO RELATED APPLICATIONS

This application is a divisional of U.S. patent application Ser. No. 16/839,001, entitled "Method and System of Running an Application", filed on Apr. 2, 2020 and issued as U.S. Pat. No. 11,467,816 on Oct. 11, 2022, which is a continuation of U.S. patent application Ser. No. 14/700,076, entitled "Method and System of Running an Application", filed on Apr. 29, 2015, which claims the benefit of U.S. Provisional Patent Application No. 62/057,633, entitled "Method and System of Running an Application", the disclosure of each of which is hereby incorporated herein in its entirety.

FIELD

This relates generally to methods and systems for running computer software, and more particularly, to methods and systems for running a software application on a device without first performing a conventional installation of the application.

BACKGROUND

To run software such as a mobile app on a device, a user typically has to download a copy of the app from an app store on a network and install it locally before the app can be used. The downloading and installation process typically requires a certain amount of time and, once downloaded, the app typically occupies a portion of the local storage space on the device, even when it is not in use.

SUMMARY

This generally relates to dynamically executing a software application (e.g., an app on a device) over a network connection without first performing a conventional local installation of the software on the device. As referred to in this document, a conventional installation is a process that typically involves copying one or more program files such as, but not limited to, executables, object code, and libraries onto one or more permanent and/or temporary storage media of the device. In contrast, the embodiments of the present disclosure can significantly reduce the number of files that need to be copied to the device before launching a software program. In some embodiments, the process of installing local program files prior to running the program can be substantially or completely eliminated. Instead, a relatively small software bundle (e.g., application (app) bundle) can be obtained from a software depository (e.g., an app store). The app bundle can include a minimum amount of information including, for example, a bundle ID and a uniform resource locator (URL) to launch the app on the device. The app bundle can be different from one used for installing a conventional app (e.g., a. binary app) in that it can include no (or a minimum number of) program file such as object codes, libraries, and executables that are included in a conventional app bundle and required to be installed locally on the device (i.e., client side) to run the app. Instead of downloading all the required client-side programs and performing a conventional installation on the device, as would typically be necessary—for a conventional app, the app bundles (referred to herein as "reduced app bundles") of the present embodiments can be dynamically launched by, for example, connecting to a server via the URL from the reduced app bundle, executing run-time codes JavaScript (JS)) to pull the required program logic and/or content from the server, and formatting and presenting the content, either directly in the app store or as a separate process, using the dynamically-pulled logic/content and templates pre-loaded on the device.

Because the reduced app bundle disclosed in the embodiments of the disclosure can be significantly smaller in size than a conventional app, it can allow for a faster download and installation than a conventional app. At the same time, from a user (or the client device's) perspective, the process for browsing for, downloading and running the app on the client device can appear largely the same as that of installing and running a conventional app. This can ensure a universal app using experience for the user regardless of the type of app and or platform being used to access the app.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This generally relates to dynamically executing a software application over a network connection without first performing a conventional local installation of the software on the device. More specifically, as detailed in the embodiments of the disclosure below, a relatively small software bundle (e.g., reduced app bundle) can be obtained from a software depository (e.g., an app store). The reduced app bundle can include a minimum amount of information including, for example, a bundle ID and a uniform resource locator (URL)

to launch the app on the device. The reduced app bundle can be different from one used for installing a conventional app (e.g., a binary app) in that it can include no (or a minimum number of) program file such as object codes, libraries, and executables that are included in a conventional app bundle and required to be installed locally on the device (i.e., client side) to run the app. Instead of downloading all the required client-side programs and performing a conventional installation on the device, as would typically be necessary for a conventional app, the reduced app bundles of the present embodiments can be dynamically bunched by, for example, connecting to a server via the URL from the reduced app bundle, executing run-time codes (e.g., JavaScript (JS)) to pull the required program logic and/or content from the server, and formatting and presenting the content, either directly in the app store or as a separate process, using the dynamically-pulled logic/content and templates pre-loaded on the device.

Figure 9:
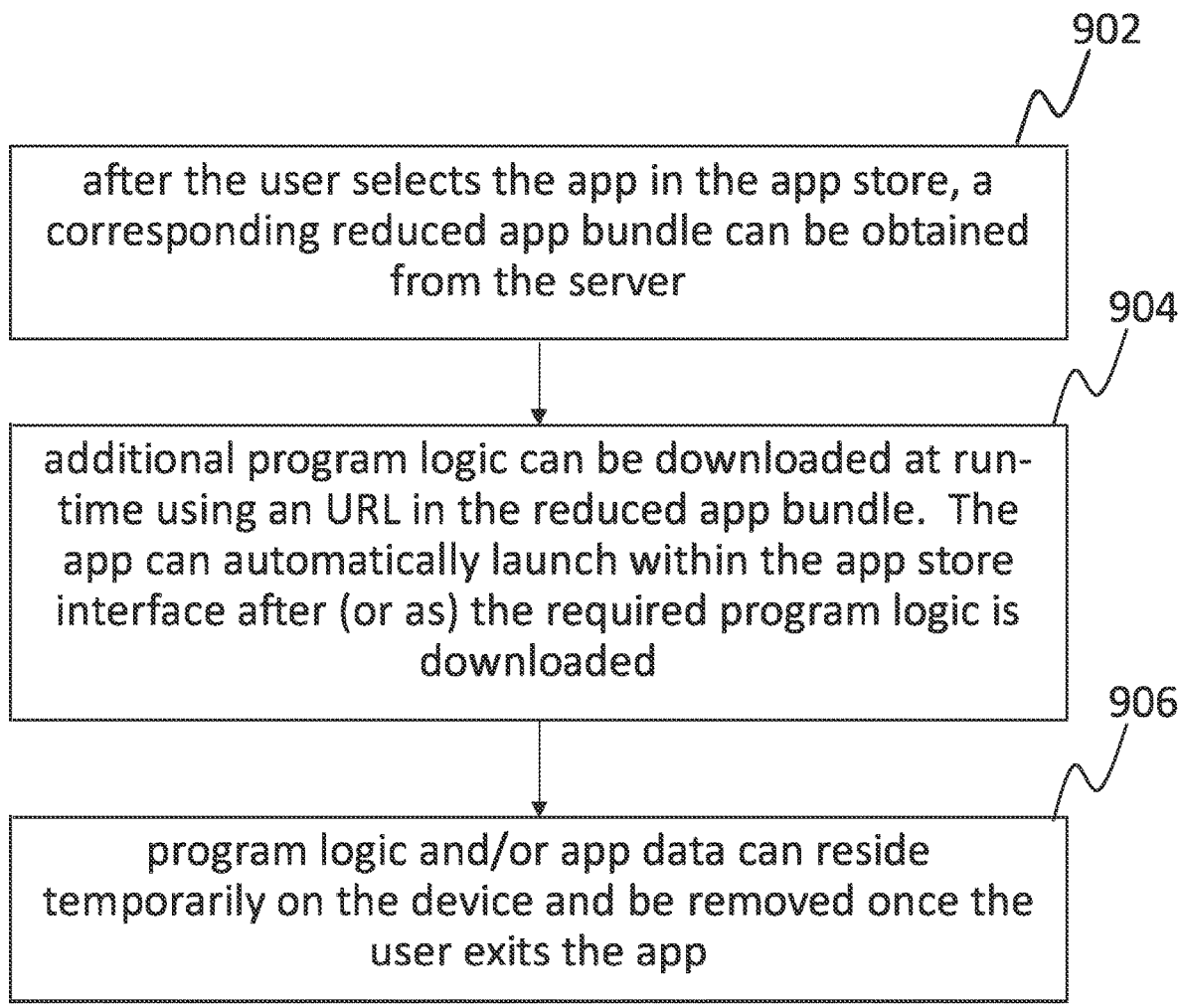
FIG. 9 is a flowchart illustrating an example process in accordance with one or more implementations.

When running an app directly in the app store according to embodiments of the disclosure, the app can be located m the app store and selected by the user just like any other conventional apps. However, unlike a conventional app, the app in these embodiments can launch directly from the app store in response to the user selection without having to be first installed locally on the client device or being identified by an icon on the user interface of the device. Instead, with reference to FIG. 9, after the user selects the app in the app store, a corresponding reduced app bundle can be obtained from the server (902) and additional program logic can be downloaded at run-time using an URL in the reduced app bundle. The app can automatically launch within the app store interface after (or as) the required program logic is downloaded (904). No separate icon representing the app may be necessary. In some embodiments, no program logic and/or app data needs to reside on the client device permanently. Instead they can reside temporarily on the device and be removed once the user exits the app (906). If the app is for streaming media content, the content can be displayed in a user interface embedded in the app store.

Because the reduced app bundle disclosed in the embodiments of the disclosure can be significantly smaller in size than a conventional app, it can allow for a faster download and installation than a conventional app. At the same time, from a user (or the client device's) perspective, the process for browsing for, downloading and running the app on the client device can appear largely the same as that of installing and running a conventional app. This can ensure a universal app-using experience for the user regardless of the type of app and/or platform being used to access the app.

Although the following embodiments are described using a streaming media app as an example, it should be understood that the disclosure is not limited to the particular types of apps. It should also be understood that the disclosure is not limited to the specific programming languages/tools (client side and/or server side), application programming interfaces (APIs), operating systems, computing platforms, client devices servers, and networks, etc., described in these specific embodiments. For example, the app can be any type of software capable of running on a computing device. Such software can include, but are not limited to, apps such as Netflix and Hulu plus for streaming multimedia content to a client device. The apps can run on different types of devices, such as mobile devices (e.g., iPhones, Android devices, Windows devices) and digital media players (e.g., Apple TV and Roku). The devices can support various platforms and operating systems (IOS, Android, Windows). The client device can be any of these devices mentioned above, but is not so limited. The server can be any computer accessible via a network by the client device(s) and from which information such as apps and/or content can be downloaded. Exemplary networks for connecting the server and client(s) can include, but are not limited to the Internet, local area network (LAN), wide area network (WAN), virtual private network (VPN), etc. Although JavaScript and XML are mentioned specifically in the embodiments as exemplary programming languages that can be used for coding the disclosed methods and systems, it should be understood that other programming languages can also be used for achieving the same purpose.

Figure 1:
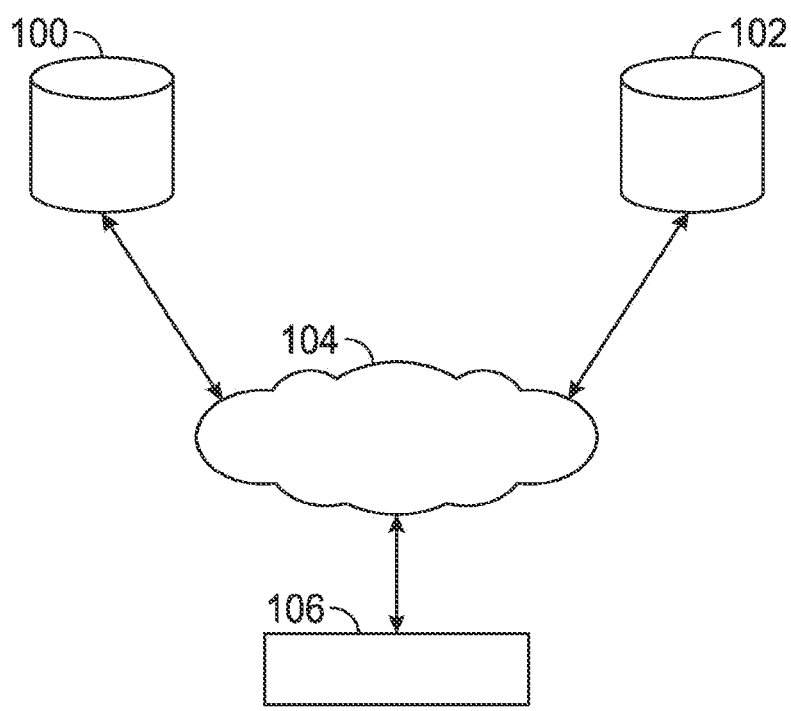
FIG. 1 is a block diagram illustrating an exemplary network including various devices, according to an embodiment of the disclosure.

FIG. 1 illustrates an exemplary network connecting various devices, according to an embodiment of the disclosure. As illustrated, the devices can include, for example, server 100 which can host one or more software applications (or mobile apps) available for download, server 102 which can host a variety of content for streaming and/or download, and a digital media player 106 (e.g., a tablet computer, Apple TV, a laptop or desktop computer) for playing media content (e.g., movies, TV shows, songs) obtained from server 102 on a display device (not shown). The display device can be a built-in display of the digital media player 106 or an external display (e.g., a monitor or TV) connected to the digital media player 106. The servers 100, 102, and digital media player 106 can be connected to each other via network 104. Although only one digital media player 106 is shown in FIG. 1, it should be understood that additional digital media players and/or other client devices can be connected to the same network 104.

In one embodiment, servers 100 and 102 can be the same server that can provide both apps and content to the client devices. In other embodiments, servers 100 and 102 can be separate devices controlled by the same or different entities. Server 100 can have access to a repository of apps that have been approved for use and/or download. The repository can be a local or network-based (e.g., cloud-based) database. Additionally or optionally, server 100 can host an app store accessible from the devices (e.g., digital media player 106) on the network via, for example, an app store application on each of the devices. Additionally or optionally, server 100 can also perform user authentication, payment verification, and other processes that may be a part of the app download process. Server 102 can provide logic and/or content to run a particular app (e.g., a streaming media app) on the digital media player 106 (and/or other devices on the same network). Digital media player 106 can access the app store hosted on server 100 via the network 104 (e.g., the Internet). The network can be a secured or unsecured network. In one example, server 100 can be an Apple server hosting the apps in the Apple app store and server 192 can be a Netflix server for streaming movies and TV shows available on Netflix.

In this embodiment, an exemplary app can be an application for streaming multimedia content to the digital media player 106 (e.g., Netflix or Hula) (referred to as "feed based apps"). The speed at which a user can access content can be particularly important for feed based apps such as the Netflix or Hulu apps because the user typically wants to run the app and start viewing the content with minimum delay. Accordingly, performing a conventional download and installation of the app before running it on the device may take too long and, thus, negatively affect the user's experience of using the app (or any other apps that may require a relatively lengthy download and installation process).

Figure 2:
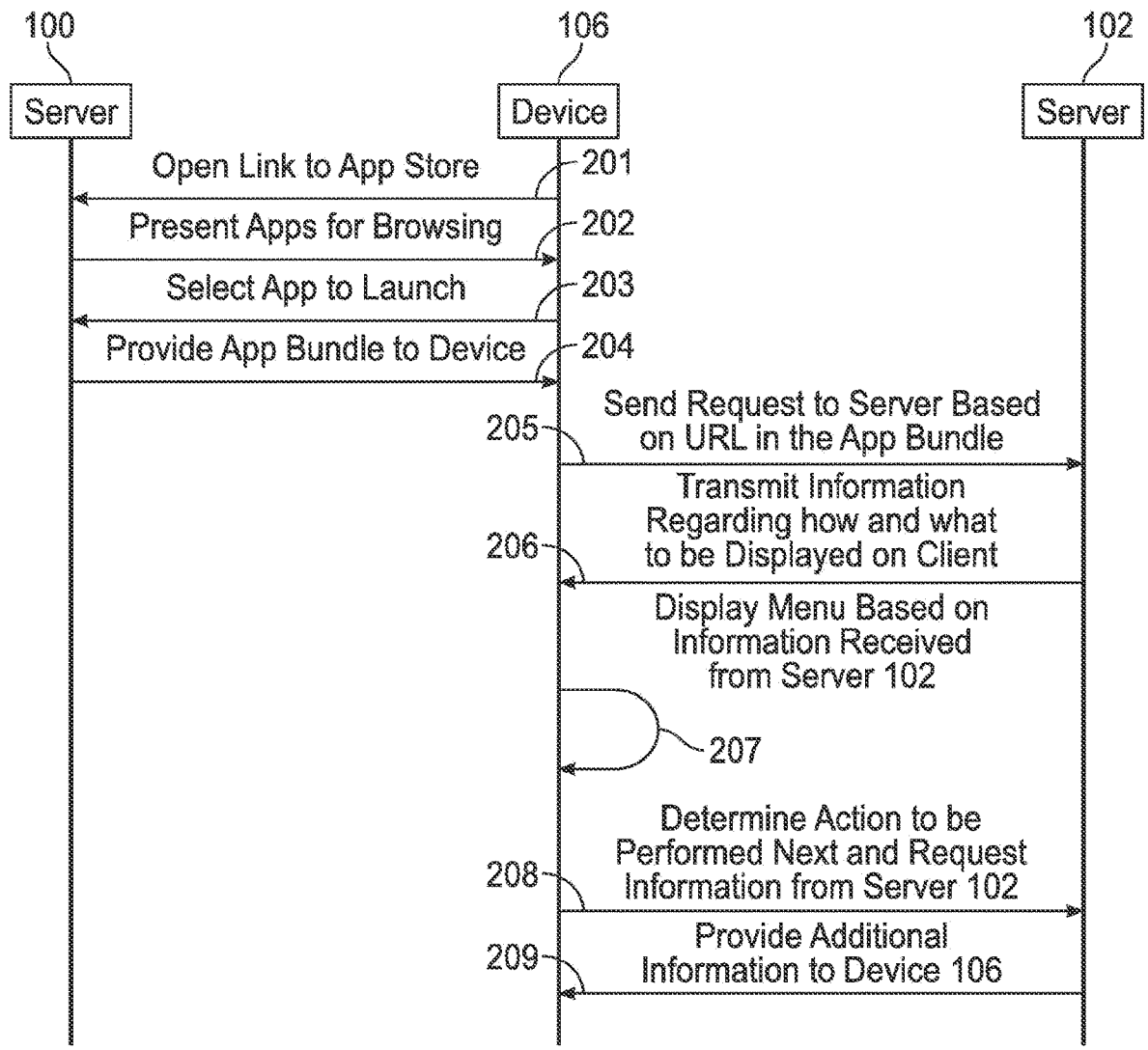
FIG. 2 is a flowchart illustrating the exemplary steps of a method of running an app without first performing a full installation of the app, according to an embodiment of the disclosure.

FIG. 2 illustrates the exemplary steps of a method for running an app without first performing a conventional installation of the app, according to an embodiment of the disclosure. In this embodiment, the app can be a feed based app such as the Netflix or Hulu app capable of feeding multimedia. content to the client device(s). However, it should be understood that the disclosed method can be easily applied to other types of apps or software.

As illustrated in FIG. 2, first, the user can open a link to the app store hosted by server 100 from his device 106 (step 201). The device 106 can be a digital media player, such as an Apple TV. Server 100 can present available apps in the app store on an interface of the digital media player 106 (step 202). The user can browse the apps and select an app to be launched on the digital media player (step 203). In response to the user's selection, server 100 can provide a reduced app bundle to the device 106 (step 204), However, the reduced app bundle of this embodiment can be different from the one used for the installing a conventional app in that the reduced app bundle can omit a significant amount of data and/or program files that are usually included in a typical app bundle for a conventional app. Accordingly, the reduced app bundle can be a lot smaller in size.

Figure 3:
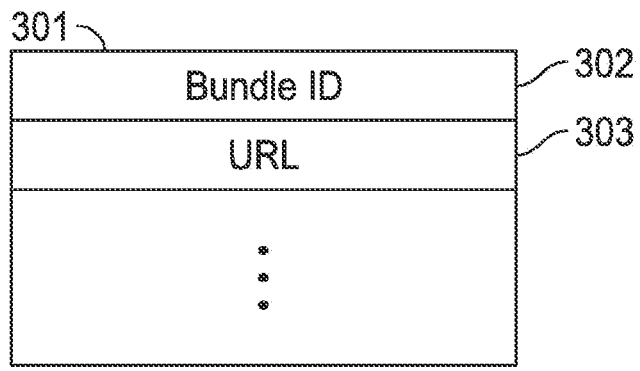
FIG. 3 is a diagram illustrating the exemplary structure of a reduced app bundle used for funning an app, according to an embodiment of the disclosure.

FIG. 3 illustrates the exemplary structure of a reduced app bundle 301 provided in step 204 of FIG. 2. Reduced app bundle 301 can include an identifier, such as a bundle ID 302. Alternatively or additionally, it can include an App ID (not shown in FIG. 3). In contrast to a conventional app bundle, reduced app bundle 301 does not need to include any program files such as Mach-O files that are typically copied to the client device during a conventional installation arid called upon to launch the app. Instead, reduced app bundle 301 can include a root URL associated with the app. The root URL can identify the location of a server from which additional information can be provided dynamically to the client device for running the app. The additional information can include, for example, program logic that can determine, for example, the format in which content is presented on the client device and, additionally or alternatively, the actual content to be fed to the client device once the app is up and running. Although not shown in FIG. 3, reduced app bundle 301 can optionally include an app icon, vender ID, and other basic information relating to the app. Because reduced app bundle 301 does not need to include any program files to be installed on the client device, the size of the bundle 301 can be significantly smaller than conventional app bundles. As such, reduced app bundle 301 can be retrieved more quickly from server 100 after the user selects it from the app store interface.

Referring back to FIG. 2, after the reduced app bundle is received by device 106, the root URL in the reduced app bundle can be extracted and device 106 can identify server 102, based on the URL, as the server from which additional information programming logic and content) for running the app can be retrieved, In one embodiment, a JavaScript program linked to the URL can be called to request the additional information from server 102 (step 205). In other embodiments, it should be understood that other means or programs can be used in place of the Java Script program to make the same request. In some embodiments, the app can be a third-party app the Netflix app) and server 102 can be a third-party server (e.g., one of Netflix's servers) and the additional information requested can be information relating to the format and content specific to the third-party app. In other embodiments, server 102 can be a server controlled by the same entity hosting the app store. In other words, server 102 and server 100 can be controlled by the same entity or even be the same server.

In response to the request received-from device 106, server 102 can provide one or more items to be sent to device 106 for display and the logic that determines how the item(s) can displayed in a user interface on to device 106 (step 206). In one embodiment, this information can be transmitted in the form of, for example, an Extensible Markup Language (XML) page (or in any other suitable markup language). The items to be displayed can include, for example, user interface items such as menu items for selecting and/or searching for content for viewing. The logic relating to how these items are displayed can determine, for example, which pre-existing template to be used for displaying the items or a particular layout specifying the location, size, and order of each of the menu items on the user interface of device 106. In the above embodiment, the XML page can define the template and/or the user interface elements to fill the template with. Depending on the app, examples of templates can include, for example, layouts mimicking a "room" or a "shelf". In one embodiment, only a limited number of templates can be made available to the apps and customization of the templates can be restricted. This can minimize the amount of information needed from server 102 to present, for example, the menu items on device 106. In addition, this allows the same templates to be made available on different platforms.

Device 106 can display a menu in a specified template or format with the desired menu items according to the information from the XML page (step 207). A user can then select one of the displayed menu items and an event handler can determine the appropriate action to be performed next in response to the selection (step 208). In one embodiment, the event handler can be another JavaScript program running in the app store. The JavaScript program can trigger different actions in response to various user inputs. The one or more Java Script programs can form a JavaScript API, which can be available to one or more apps running on device 106. In other words, the Java Script programs can be generic with respect to the different apps and designed to respond to specific events that are universal to multiple apps. The action to be performed next can be, for example, retrieving a sub-menu from server 102 or requesting actual media content from server 102 to be displayed on device 100. Server 102 can respond accordingly by providing the requested information (step 209).

The exemplary steps shown in FIG. 2 can provide a mechanism for running an app without first performing an installation on the client device (e.g., device 106). In other words, no program files such as Mach-O code have to be included in the reduced app bundle and extracted to perform a local installation on the client device. Instead, the process of FIG. 2 can involve extracting an URL from the reduced app bundle and establishing communication with a server (e.g., server 102) to retrieve the information such as program logic and content needed to run the app directly from the app store or as a separate process on the client device. This can provide flexibility in that the app only needs to retrieve logic or content on an as-need basis. While updating a template in an app installed on a client device may require downloading and executing a newer version of the app, the same task can be performed dynamically through a relatively simple change to the JavaScript program controlling the template in the embodiments of this disclosure.

In one embodiment, the process of running an app, as illustrated in FIG. 2, can be performed entirely or at least partially within the app store without having the app installed separately on the device 106. When running the app directly in the app store, the app does not have to have its own icon or open up a separate user interface on the display of the device. For example, in one embodiment, after the user selects the media content streaming app, the menu items of the app can be displayed within the app store user interface. After the user selects a piece of content for viewing, the content can also be displayed directly from the app store.

The app bundle (e.g., reduced app bundle 301) can be kept light-weighted due to the lack of program files and thus allow for a quick retrieval. However, from the user's perspective, the process of FIG. 2 can appear to be no different from the process of running an app installed locally on the device other than that the time required to run the app can be much less than for a conventional app.

Figure 4:
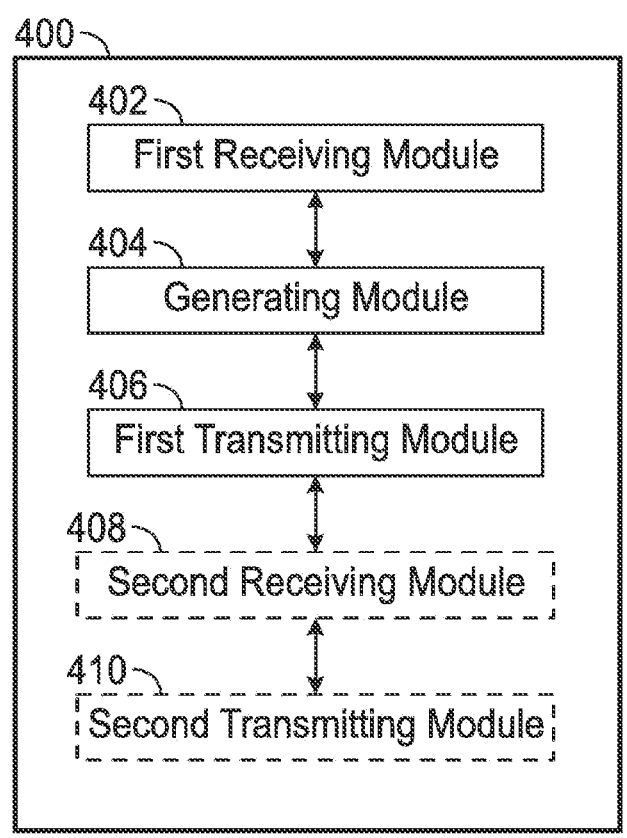
FIG. 4 is a block diagram illustrating the exemplary modules of a server according to an embodiment of the disclosure.

FIG. 4 is a block diagram illustrating the exemplary module of a server 400 such as server 100 of FIG. 1. Server 400 can include, for example, a first receiving module 402, a generating module 404, and a first transmitting module 406 connected to each other. The first receiving module 402 can be configured for receiving, from a client (not shown in FIG. 4), an input for initiating the application. In one embodiment, the input can be in response to a user selecting an app in an app store on the client. The generating module 404 can be configured for generating an application bundle including an address of another server (e.g., server 102 of FIG. 1). The address can enable a program on the client to request information from the other server (e.g., server 102 of FIG. 1). In one embodiment, the address can be a uniform resource locator (URL). The application bundle can additionally include one or more of an application bundle ID, application ID, vendor ID, and entitlements. The application bundle can be free of program files for running an installation on the client. The first transmitting module 406 can be configured for transmitting the application bundle to the client.

Optionally, as illustrated in FIG. 4, server 400 can also include additional modules such as a second receiving module 408 and a second transmitting module 410. The second receiving module 408 can be configured for receiving the request for information from the client. The information can include, for example, programming logic or content for running the application on the client. The second transmitting module 410 can be configured for transmitting the requested information to the client. In some embodiments, the first and second transmitting modules 406, 410 can be the same module. Similarly, the first and second receiving modules 402, 408 can also be the same module.

Figure 5:
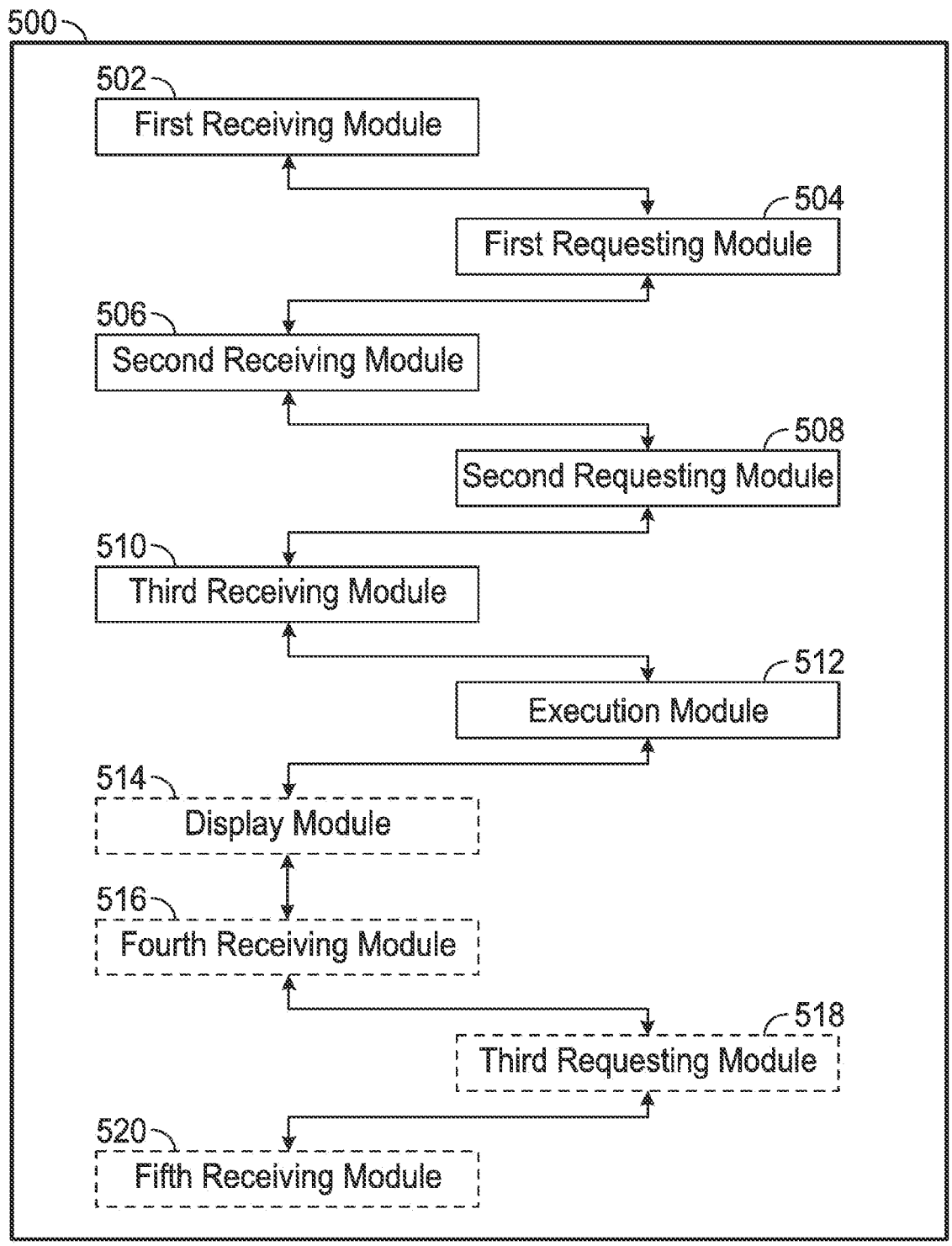
FIG. 5 is a block diagram illustrating the exemplary modules of a client device, according to an embodiment of the disclosure.

FIG. 5 is a block diagram illustrating the exemplary modules of a client device 500 such as the digital media player 106 of FIG. 1. Client device 500 can include, for example, a first receiving module 502, a first requesting module 504, a second receiving module 506, a second requesting module 508, a third receiving module 510, and an execution module 512. Each of these modules can be connected to one or more of the other modules. The first receiving module 502 can be configured for receiving a first user input selecting an application. The user input can be, for example, a selection of a particular app in an app store. The first requesting module 504 can be configured for requesting an application bundle associated with the selected application from a first server in response to the first user input. The application bundle can be free of program files for running an installation of the app on the client. The second receiving module 506 can be configured for receiving, from the first server, the application bundle, which can include an address of a second server. The address can be an URL of the second server. The second requesting module 508 can be configured for requesting information from the second server using the address in the application bundle. The third receiving module 510 can be configured for receiving the requested information from the second server. The requested information can include, for example, program logic and/or content for running the application. The execution module 512 can be configured for dynamically executing the application using the received information, for example, the execution module 512 can run the program logic in the received information to determine a template for displaying menu items of the app on a display associated with the client device. Additionally or alternatively, the execution module 512 can populate the template with the content (e.g., menu items) in the received information.

In one embodiment, client device 500 can also include one or more of the following modules: a displaying module 514, a fourth receiving module 516, a third requesting module 518, and a fifth receiving module 520 connected to each other. The displaying module 514 can be configured for displaying a user interface associated with the application. The fourth receiving module 516 can be configured for receiving a second user input directed to the user interface. The third requesting module 818 can be configured for requesting content from the second server in response to the second user input. The fifth receiving module 520 can be configured for receiving the requested content from the second server. In one embodiment, one or more of the first, second, third, fourth, and fifth receiving modules can be the same module. Similarly, one or more of the first, second, and third requesting modules can be the same module.

In some embodiments, one or more of the modules of server 400 and/or client 500 can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 6:
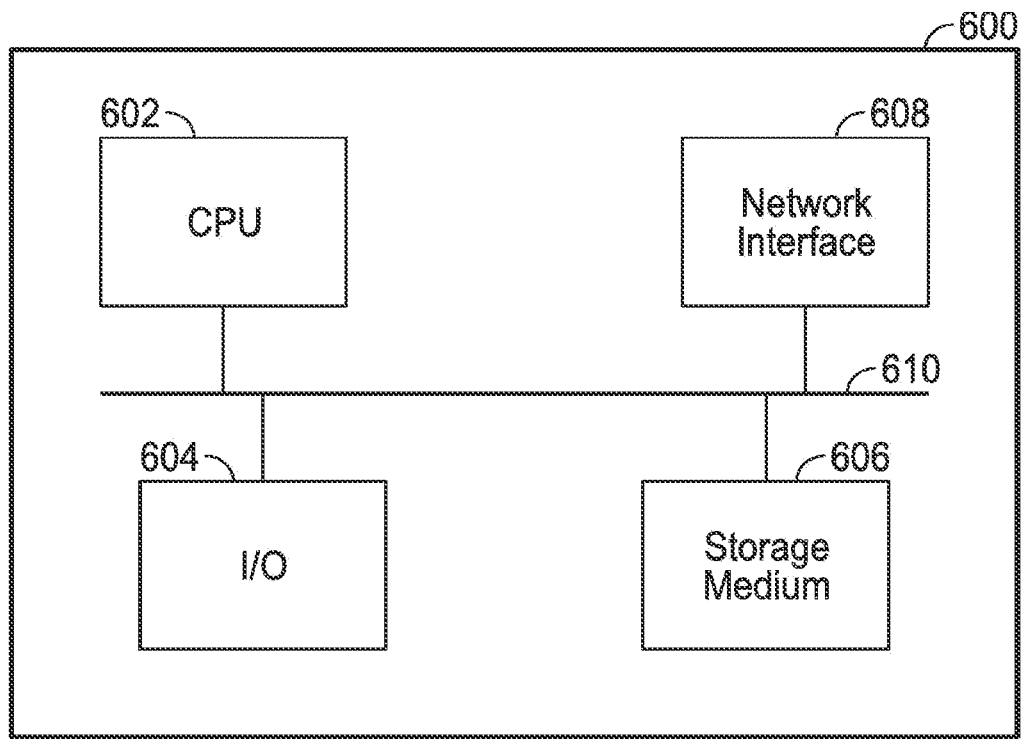
FIG. 6 illustrates exemplary components of a computing system such as a server or client described in the embodiments of the disclosure.

The non-transitory computer readable storage medium can be part of a computing system serving as the server or the client. FIG. 6 illustrates exemplary common components of one such computing system. As illustrated, the system 600 can include a central processing unit (CPU) 602, I/O components 604 including, but not limited to one or more of display, keypad, touch screen, speaker, and microphone, storage medium 606 such as the ones listed in the last paragraph, and network interface 608, all of which can be connected to each other via a system bus 610. The storage medium 606 can include the modules of FIGS. 4 and 5 depending on whether the system is a server or a client.

One or more Application Programming Interfaces (APIs) may be used in some embodiments. For example, one or more the JavaScript programs mentioned in the embodiments above can form an API for communicating with one or more of the servers and dynamically requesting and receiving information for the server(s). It should be understood that the API can include additional code in other programming language in lieu of or in addition to the JavaScript programs discussed above.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the APT call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component) however the API may be implemented in terms of a specific programming language. An API-calling component can, in one embedment, call APIs from different providers such as a set of APIs from an OS provider and another set of APIs from a plug-in provider and another set of. AP Is from another provider (e.g., the provider of a software library) or creator of the another set of APIs.

Figure 7:
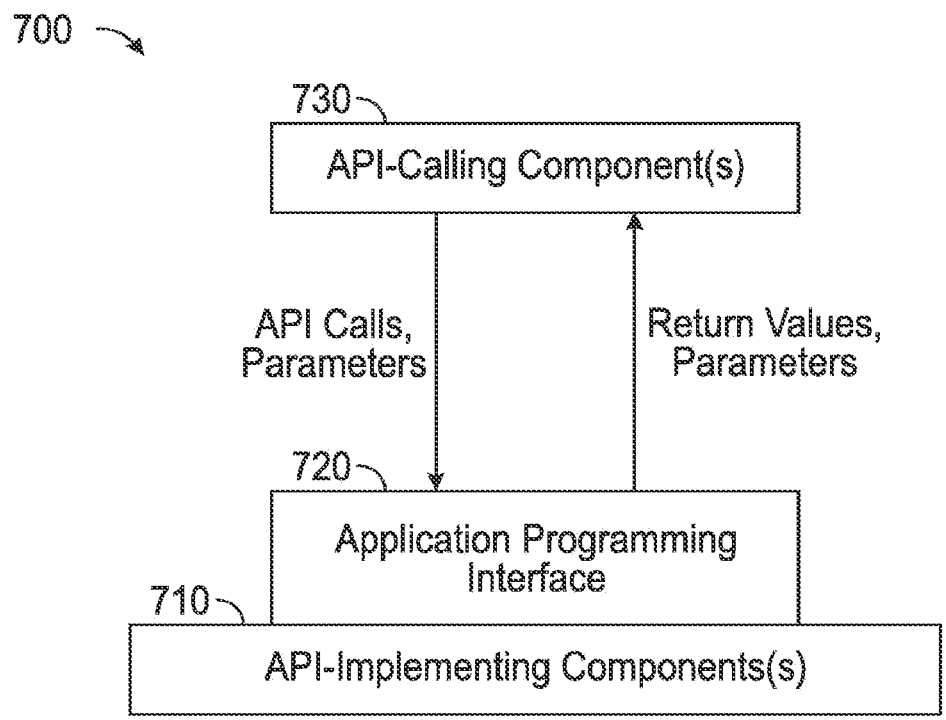
FIG. 7 is a block diagram illustrating an exemplary API architecture, which may be used in some embodiments of the disclosure.

FIG. 7 is a block diagram illustrating an exemplary API architecture, which may be used in some embodiments of the disclosure. As shown in FIG. 7, the API architecture 700 includes the API-implementing component 710 (e.g., an operating system, a library, a device driver, an API, an application program, software or other module) that implements the API 720. The API 720 specifics one or more functions, methods, classes, objects, protocols, data structures, formats and/or other features of the API-implementing component that may be used by the API-calling component 730. The API 720 can specify at least one calling convention that specifies how a function in the API-implementing component receives parameters from the API-calling component and how the function returns a result to the API-calling component. The API-calling component 730 (e.g., an operating system, a library, a device driver, an API, application program, software or other module), makes API calls through the API 720 to access and use the features of the API-implementing component 710 that are specified by the API 720. The API-implementing component 710 may return a value through the API 720 to the API-calling component 730 in response to an API call.

It will be appreciated that the API-implementing component 710 may include additional functions, methods, classes, data structures, and/or other features that are not specified through the API 720 and are not available to the API-calling component 730. It should be understood that the API-calling component 730 may be on the same system as the API-implementing component 710 or may be located remotely and accesses the API-implementing component 710 using the API 720 over a network. While FIG. 7 illustrates a single API-calling component 730 interacting with the API 720, it should be understood that other API-calling components, which may be written in different languages (or the same language) than the API-calling component 730, may use the API 720.

The API-implementing component 710, the API 720, and the API-calling component 730 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 8:
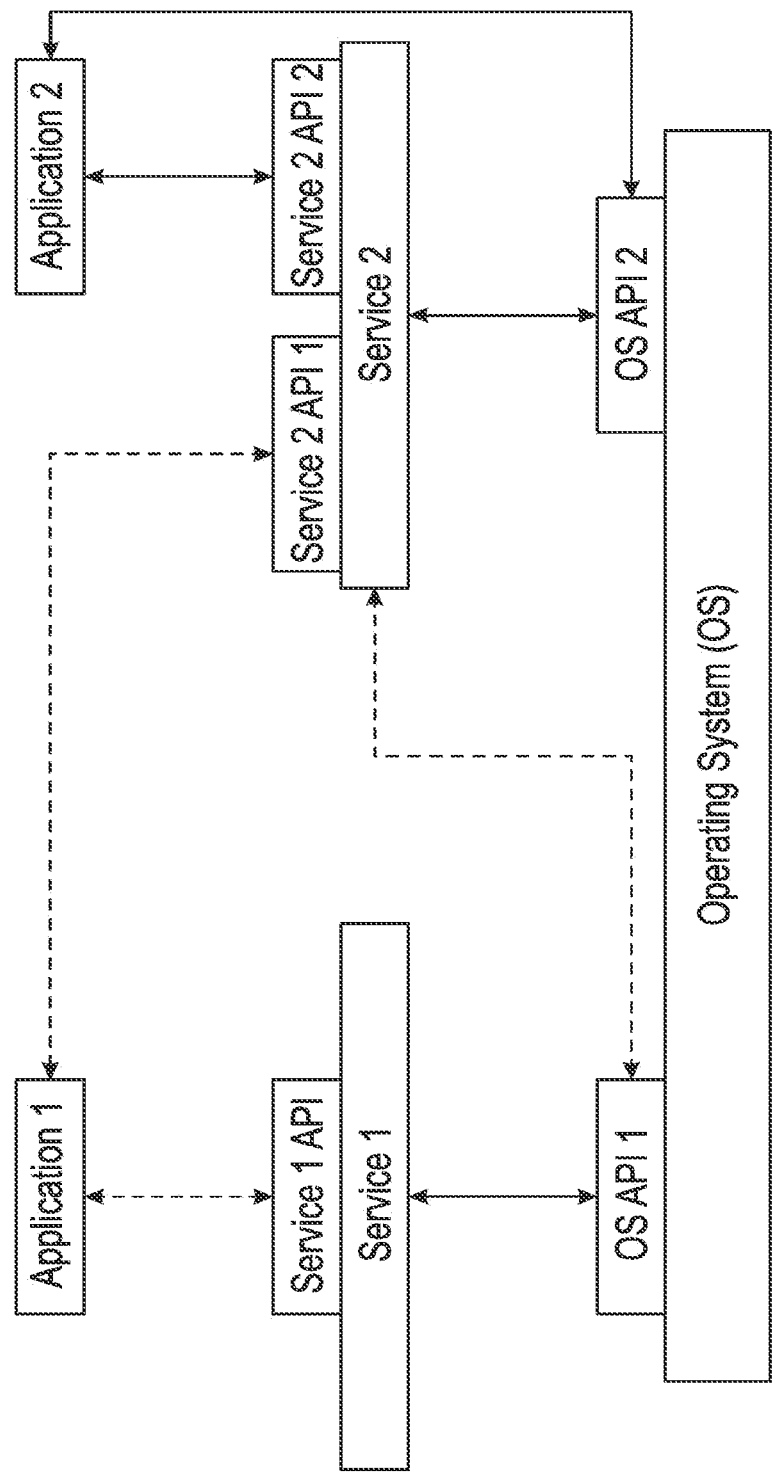
FIG. 8 is a diagram illustrating the exemplary interactions among the components of a system, according to the embodiments of the disclosure.

In FIG. 8 ("Software Stack"), an exemplary embodiment, applications can make calls to Services A or B using several Service APIs and to Operating System (OS) using several QS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a, software library) makes calls to and receives returned values from OS API 1, and Service 2 (which can be, for example, a software library) makes calls to and receives returned values from both OS API I and OS API 2. Application 2 makes calls to and receives returned values from OS API 2.

Although embodiments have been fully described, with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method of operating a device, the method including:
   downloading reduced temporary logic for a portion of an application on the device;
   running the reduced temporary logic for the portion of the application on the device while at least the portion of the application is open on the device; and
   removing the reduced temporary logic from the device after the at least the portion of the application is closed by the device, wherein the downloading, the running, and the removing of the reduced temporary logic on the device are performed without providing an icon for the application on the device.

2. The method of claim 1, wherein the reduced temporary logic comprises a reduced application bundle having a size that is smaller than a size of an application bundle for the application.

3. The method of claim 2, further comprising, after removing the reduced temporary logic from the device:
   downloading the application bundle for the application; and
   installing the application on the device using the application bundle.

4. The method of claim 3, further comprising, after the installing of the application, generating the icon for the application in a user interface on the device.

5. The method of claim 2, further comprising downloading additional program logic for an additional portion of the application while running the reduced temporary logic, using a universal resource locator in the reduced application bundle.

6. The method of claim 1, wherein the downloading of the reduced temporary logic is performed responsive to a selection of the application from within another application running on the device.

7. A device comprising:
   a memory; and
   at least one processor configured to:
      download reduced temporary logic for a portion of an application on the device;
      install the reduced temporary logic at the device;
      run the reduced temporary logic for the portion of the application on the device while at least the portion of the application is open on the device; and
      remove the reduced temporary logic from the device responsive to the at least the portion of the application being closed by the device.

8. The device of claim 7, wherein the at least one processor is configured to download, run, and remove the reduced temporary logic without providing an icon for the application on the device.

9. The device of claim 7, wherein the reduced temporary logic comprises a reduced application bundle having a size that is smaller than a size of an application bundle for the application.

10. The device of claim 9, wherein the at least one processor is further configured to:
    after removal of the reduced temporary logic from the device:
    download the application bundle for the application; and
    install the application on the device using the application bundle.

11. The device of claim 10, wherein the at least one processor is further configured to:
    after installation of the application, generate an icon for the application in a user interface on the device.

12. The device of claim 9, wherein the at least one processor is further configured to:
  download additional program logic for an additional portion of the application while running the reduced temporary logic, using a universal resource locator in the reduced application bundle.

13. The device of claim 7, wherein the at least one processor configured to download the reduced temporary logic responsive to a selection of the application from within another application running on the device.

14. A non-transitory machine-readable medium comprising instructions that, when executed by one or more processors of a device, cause the one or more processors to perform operations comprising:
  downloading reduced temporary logic for a portion of an application on the device;
  running the reduced temporary logic for the portion of the application on the device while at least the portion of the application is open on the device; and
  removing the reduced temporary logic from the device once the at least the portion of the application is closed by the device.

15. The non-transitory machine-readable medium of claim 14, wherein the downloading, the running, and the removing of the reduced temporary logic on the device are performed without providing an icon for the application on the device.

16. The non-transitory machine-readable medium of claim 14, wherein the reduced temporary logic comprises a reduced application bundle having a size that is smaller than a size of an application bundle for the application.

17. The non-transitory machine-readable medium of claim 16, wherein the operations further comprise:
  after removing the reduced temporary logic from the device:
    downloading the application bundle for the application; and
    installing the application on the device using the application bundle.

18. The non-transitory machine-readable medium of claim 17, further comprising, after the installing of the application, generating an icon for the application in a user interface on the device.

19. The non-transitory machine-readable medium of claim 16, further comprising downloading additional program logic for an additional portion of the application while running the reduced temporary logic using a universal resource locator in the reduced application bundle.

20. The non-transitory machine-readable medium of claim 19, wherein the downloading of the reduced temporary logic is performed responsive to a selection of the application from within another application running on the device.

* * * * *